United States Patent
Hussain et al.

(10) Patent No.: US 10,123,036 B2
(45) Date of Patent: Nov. 6, 2018

(54) MOTION VECTOR SELECTION FOR VIDEO ENCODING

(71) Applicant: MICROSOFT TECHNOLOGY LICENSING, LLC, Redmond, WA (US)

(72) Inventors: Zahid Hussain, San Jose, CA (US); George Easton Scott, III, Seattle, WA (US); Shankar Narayan, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 22 days.

(21) Appl. No.: 14/318,105

(22) Filed: Jun. 27, 2014

(65) Prior Publication Data

US 2015/0382012 A1 Dec. 31, 2015

(51) Int. Cl.
*H04N 19/52* (2014.01)
*H04N 19/56* (2014.01)
*H04N 19/176* (2014.01)
*H04N 19/105* (2014.01)
*H04N 19/139* (2014.01)
(Continued)

(52) U.S. Cl.
CPC ........... *H04N 19/52* (2014.11); *H04N 19/105* (2014.11); *H04N 19/139* (2014.11); *H04N 19/176* (2014.11); *H04N 19/19* (2014.11); *H04N 19/194* (2014.11); *H04N 19/43* (2014.11);
(Continued)

(58) Field of Classification Search
None
See application file for complete search history.

(56) References Cited

U.S. PATENT DOCUMENTS

| | | | | |
|---|---|---|---|---|
| 5,604,546 A | * | 2/1997 | Iwata | G06T 7/202 348/413.1 |
| 6,122,320 A | * | 9/2000 | Bellifemine | G01B 31/31853 375/240 |

(Continued)

OTHER PUBLICATIONS

Han, et al., "Variable Block-Size Transform and Entropy Coding at the Enhancement Layer of FGS", In Proceedings of International Conference on Image Processing, vol. 1, Oct. 24, 2004, pages.
(Continued)

*Primary Examiner* — Mohammad J Rahman
(74) *Attorney, Agent, or Firm* — Alleman Hall Creasman & Tuttle LLP

(57) ABSTRACT

Various embodiments relating to selecting a motion vector in a hardware encoder are disclosed. In one example, a plurality of candidate predicted motion vectors are selected, and a plurality of motion searches are performed in an image region surrounding each candidate predicted motion vector to produce a plurality of resulting motion vectors, wherein each resulting motion vector has an initial cost score determined using a corresponding candidate predicted motion vector. After an actual predicted motion vector becomes available, the initial cost score of each resulting motion vector is re-scored using the actual predicted motion vector to produce an updated cost score, and video data is encoded using a motion vector selected from the plurality of resulting motion vectors based on the updated cost score of that motion vector.

20 Claims, 8 Drawing Sheets

(51) Int. Cl.
*H04N 19/19* (2014.01)
*H04N 19/194* (2014.01)
*H04N 19/43* (2014.01)
*H04N 19/436* (2014.01)
*H04N 19/567* (2014.01)

(52) U.S. Cl.
CPC ........... *H04N 19/436* (2014.11); *H04N 19/56* (2014.11); *H04N 19/567* (2014.11)

(56) References Cited

U.S. PATENT DOCUMENTS

| | | | | |
|---|---|---|---|---|
| 8,787,460 | B1* | 7/2014 | Hobbs | H04N 19/00 375/240.16 |
| 9,172,970 | B1* | 10/2015 | Maaninen | H04N 19/51 |
| 2001/0014124 | A1* | 8/2001 | Nishikawa | G06T 7/2013 375/240.16 |
| 2006/0222075 | A1* | 10/2006 | Zhang | H04N 19/61 375/240.16 |
| 2008/0112631 | A1* | 5/2008 | Huggett | H04N 19/119 382/236 |
| 2008/0232463 | A1 | 9/2008 | Lu et al. | |
| 2009/0067495 | A1 | 3/2009 | Au et al. | |
| 2010/0046614 | A1* | 2/2010 | Choi | H04N 19/176 375/240.02 |
| 2010/0166073 | A1* | 7/2010 | Schmit | H04N 19/176 375/240.16 |
| 2011/0286523 | A1* | 11/2011 | Dencher | H04N 19/56 375/240.14 |
| 2012/0076207 | A1* | 3/2012 | Schmit | H04N 19/176 375/240.16 |
| 2012/0257678 | A1* | 10/2012 | Zhou | H04N 19/436 375/240.16 |
| 2012/0321206 | A1* | 12/2012 | Sato | H04N 19/80 382/233 |
| 2013/0044804 | A1 | 2/2013 | Nilsson et al. | |
| 2013/0089137 | A1 | 4/2013 | Korman et al. | |
| 2013/0094564 | A1 | 4/2013 | Yang et al. | |

OTHER PUBLICATIONS

Hao, et al., "Macroblock-level Reduced Resolution Video Coding", In Proceedings of IEEE International Symposium on Circuits and Systems, May 27, 2007, 4 pages.

Vanam, et al., "Rate-Distortion-Complexity Optimization of Video Encoders with Applications to Sign Language Video Compressions", In Doctoral Dissertation, Sep. 30, 2013, 4 pages.

Lee, G., et al., "Algorithm/Architecture Co-Design of 3-D Spatio-Temporal Motion Estimation for Video Coding", In IEEE Transactions on Multimedia, vol. 9, Issue 3, Apr. 2007, 11 pages.

ISA European Patent Office, International Search Report and Written Opinion Issued in Application No. PCT/US2015/037309, dated Sep. 11, 2015, WIPO, 9 pages.

IPEA European Patent Office, Second Written Opinion Issued in Application No. PCT/US2015/037309, dated Feb. 9, 2016, WIPO, 5 pages.

IPEA European Patent Office, International Preliminary Report on Patentability Issued in Application No. PCT/US2015/037309, dated Jun. 15, 2016, WIPO, 6 Pages.

"Office Action Issued in European Patent Application No. 15741666.0", dated Jul. 16, 2018, 6 pages.

Momcilovic, et al., "Dynamic Load Balancing for Real-Time Video Encoding on Heterogeneous CPU+GPU Systems", In Proceedings of IEEE Transactions on Multimedia, vol. 16, Issue 1, Jan. 2014, pp. 108-121.

* cited by examiner

MOTION VECTOR SELECTION FOR VIDEO ENCODING

SUMMARY

Various embodiments relating to selecting a motion vector to increase performance of a hardware video encoder are disclosed. In one embodiment, a plurality of candidate predicted motion vectors associated with video data to be encoded are selected, and a plurality of motion searches are performed in an image region surrounding each candidate predicted motion vector to produce a plurality of resulting motion vectors, wherein each resulting motion vector has an initial cost score determined using a corresponding candidate predicted motion vector. After an actual predicted motion vector becomes available, the initial cost score of each resulting motion vector is re-scored using the actual predicted motion vector to produce an updated cost score, and video data is encoded using a motion vector selected from the plurality of resulting motion vectors based on the updated cost score of that motion vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
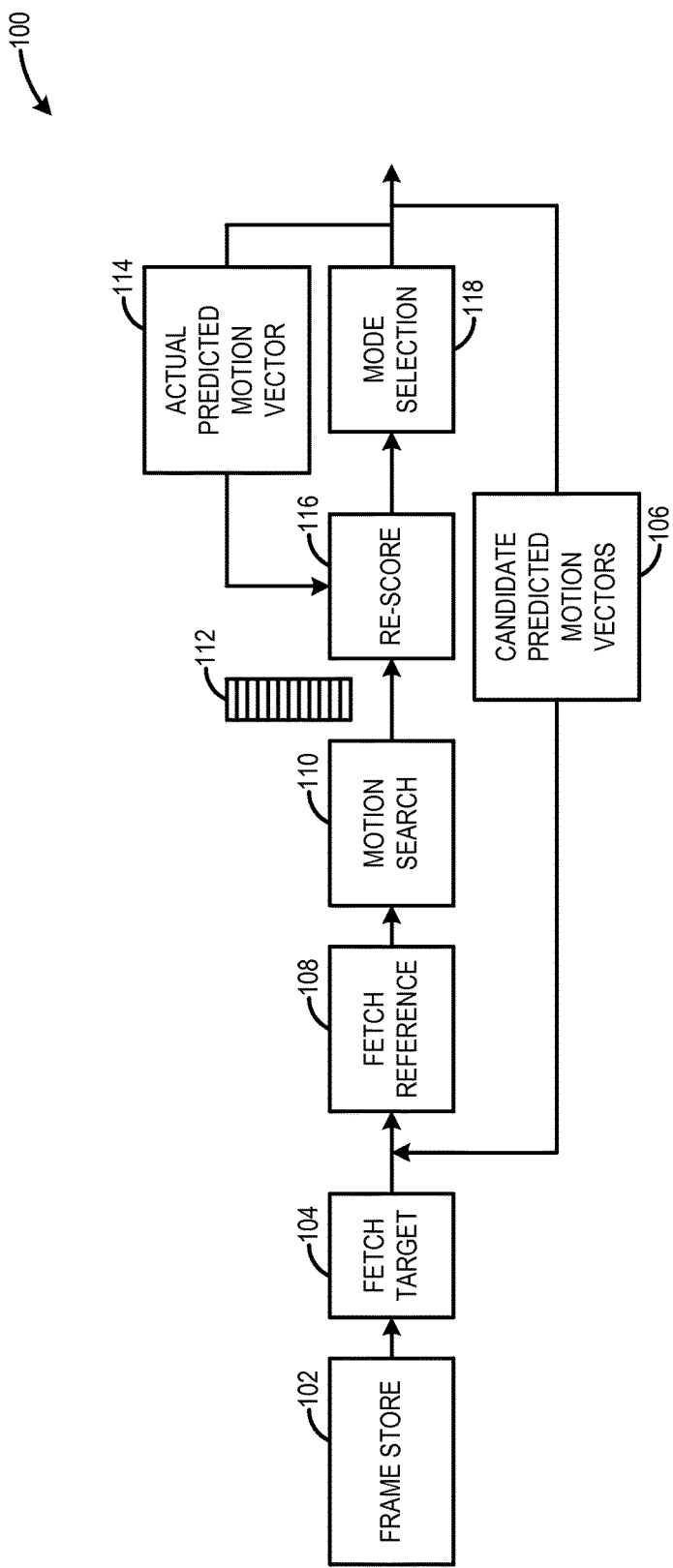
FIG. 1 shows an example video encoder processing pipeline.

In video encoding, an encoded image frame may be expressed in terms of one or more neighboring image frames using motion estimation and/or motion compensation. In one example, an image frame may be subdivided into a set of macroblocks. For each macroblock, searching may be performed to find a corresponding macroblock in previously encoded image frames (e.g., reference frames). If a corresponding macroblock is found, then that macroblock may be encoded by a motion vector that points to a position of the corresponding macroblock in the reference frame. While implementations are discussed herein in the context of image frames being partitioned into macroblocks (e.g., 16×16 macroblocks), it will be understood that an image frame may be partitioned into any suitable block size (e.g., 64×64) without departing from the scope of the present disclosure. Moreover, it will be understood that an image frame may be partitioned into any suitable shape (e.g., non-square block) without departing from the scope of the present disclosure. Furthermore, the motion vector may be encoded differentially as mvd=mv−mvp, where mvp is a predicted motion vector, mv is a detected/computed motion vector, and mvd is a resulting difference that may be encoded and transmitted. In one example, an encoded stream of video data may include reference images separated by differentially coded motion vectors representative of intermediate image frames.

By using motion estimation and motion compensation techniques, temporal redundancy between neighboring image frames may be leveraged to increase compression rates of encoded video data. As one example, video data may be encoded via a hardware pipelined video encoder to achieve desirable real-time performance. However, in such a hardware implementation, there may be pipeline dependencies that can reduce performance to less than real-time performance, if the dependencies are not resolved. For example, a previous macroblock being encoded ahead of a current macroblock in a hardware pipeline (e.g., to the left of the current macroblock in an image frame) may not be fully processed when encoding of the current macroblock is initiated. In particular, a prediction operation of the current macroblock may overlap with an encoding/reconstruction operation of the previous macroblock. Accordingly, an actual predicted motion vector may not be available to seed motion searches for the current macroblock.

In one approach to resolve this hardware pipeline dependency, a single predicted motion vector may be selected to provide a smallest distortion value in a rate-distortion function regardless of a cost of encoding the differential motion vector (mvd). However, this approach may result in an increase in processing cost that may reduce performance to less than real-time performance.

In another approach, a single predicted motion vector may be selected based on both the motion vector encoding cost and the distortion value in the rate-distortion function. For example, a predicted motion vector may be selected that provides a smallest combined cost and distortion value (e.g., within a suitable range of cost and distortion). While such an approach may result in increased performance relative to the approach that just minimizes distortion, the motion vector cost may not be as accurate as where a predicted motion vector is selected to provide a smallest distortion value. As a result, a non-optimal motion vector may be selected to encode a macroblock.

Accordingly, the present disclosure relates to an approach for helping to select an optimal predicted motion vector to encode a macroblock in a hardware pipelined real-time video encoder. Briefly, in some implementations, a plurality of candidate predicted motion vectors may be used to seed a plurality of motion searches. Then, an initial cost score may be determined for each of the resulting motion vectors using a corresponding candidate predicted motion vector in a rate-distortion function. A filtering operation may be performed to select a set of filtered motion vectors having a low initial cost score from the resulting motion vectors. When the actual predicted motion vector from the previous macroblock becomes available, the initial cost score of encoding the filtered motion vectors may be updated using the actual predicted motion vector in the rate-distortion function. A filtered motion vector having a lowest updated cost score may be selected to encode the macroblock.

Further, the selected filtered motion vector may be used to select a reference index and a block partition used to encode the macroblock.

By using a plurality of different candidate predicted motion vectors as initial seeds for motion searches, motion searches may be performed without having to wait for the actual predicted motion vector to become available. Moreover, by correcting the cost scores of the search results using the actual predicted motion vector when it becomes available, accurate cost scores may be used to select a motion vector for encoding the video data. Accordingly, a lowest cost motion vector may be determined without having to stall the hardware pipeline.

FIG. 1 shows an example video encoder processing pipeline 100 configured to encode video data according to the approach described above. The pipeline 100 may initiate the encoding process at a fetch target stage 104 configured to fetch a target macroblock from a frame store 102.

A candidate predicted motion vectors stage 106 may be configured to select a plurality of candidate predicted motion vectors for use in a plurality of motion searches. The plurality of candidate predicted motion vectors may be selected in any suitable manner. For example, the plurality of candidate predicted motion vectors may be selected based on predicted motion vectors that are available from previously encoded macroblocks. In one particular example, the plurality of candidate predicted motion vectors may include one or more of a predicted motion vector from a neighboring macroblock of a same image frame, a predicted motion vector from a same macroblock of a temporally different image frame, a predicted motion vector from a neighboring macroblock of a temporally different image frame, and a zero motion vector (e.g., 0, 0). Selection of candidate predicted motion vectors will be discussed in further detail below with reference to FIG. 2.

A fetch reference stage 108 may be configured to fetch a reference frame used for the plurality of motion searches from the frame store 102. Further, a motion search stage 110 may be configured to perform a plurality of motion searches for each candidate predicted motion vector. In one example, a motion search may include computing a sum of absolute difference (SAD) between the target and the prediction. In another example, a motion search may include computing a sum of squared difference (SSD) between the target and the prediction. Each motion search may include a separate search pattern. For example, search patterns may include square, diamond, cross-shaped, spiral, and other suitable shaped patterns. Further, each motion search may include a separate search region. For example, search regions may vary in size by different horizontal and vertical offsets, and other suitable changes in region size. In some implementations, the same combination of motion search patterns and regions may be used for each candidate predicated motion vector. Likewise, in some implementations, different combinations of motion search patterns and regions may be used for different candidate predicted motion vectors. In one example, a convex hull of a region enclosing the plurality of candidate predicted motion vectors may be used as the search region for one or more of the motion searches.

A cost score may be calculated for each resulting motion vector using a corresponding candidate predicted motion vector in a rate-distortion function. In one example, the rate distortion function may be represented as follows:

$$J_{motion}(m, REF | \lambda_{motion}) =$$

-continued
$$\underbrace{DISTFUNC(s, c(REF, m))}_{Distortion} + \underbrace{\lambda_{motion} \cdot (R(m-p) + R(REF))}_{Rate}$$

When the search results are scored initially, (p) represents a corresponding candidate predicted motion vector used to seed a given search, (m) represents a resulting motion vector, and $J_{motion}(m, REF|\lambda_{motion})$ represents the cost score.

In some implementations, the pipeline 100 may include a filter stage 112 configured to select from the plurality of resulting motion vectors a subset of filtered motion vectors having a lowest initial cost score. The set filtered motion vectors may be stored and tracked further in the pipeline. In one example, the other resulting motion vectors not selected as filtered motion vectors may be discarded. Accordingly, data storage hardware resources may be reduced in the pipeline. Moreover, downstream processing of the motion search results may be reduced. A more detailed example of a filter process for the motion search results is discussed in further detail below with reference to FIG. 3.

Continuing with FIG. 1, an actual predicted motion vector stage 114 may be configured to produce an actual predicted motion vector from encoding of the previous macroblock in the pipeline 100. As discussed above, the actual predicted motion vector may not become available until after the current macroblock has begun the encoding process. Accordingly, the actual predicted motion vector may become available at this stage in the processing pipeline.

The actual predicted motion vector may be provided to a re-score stage 116. The re-score stage 116 may be configured to, after the actual predicted motion vector becomes available from the actual predicted motion vector stage 114, re-score the initial cost score of each resulting motion vector (or filtered motion vector in the subset) using the actual predicted motion vector as (p) in the rate-distortion function to produce an updated cost score $J_{motion}(m, REF|\lambda_{motion})$. In particular, just the rate may be recomputed, as the distortion is independent of the predicted motion vector and does not change when the predicted motion vector changes.

A mode selection stage 118 may be configured to select a motion vector based on updated cost score to encode the macroblock. In one example, the mode selection stage 118 may be configured to select a motion vector having a lowest updated cost score. In some implementations, the mode selection stage 118 may be configured to select a motion vector and/or encoding mode based on a weighted prediction. For example, a linear combination of motion vectors temporally related (e.g., in image frames before and after the predicted motion vector) to the motion vector may be used to make a mode selection to encode the video data. In some implementations, the mode selection stage 118 may be configured to select a reference index based on the motion vector having the lowest updated cost score. Further, in some implementations, the mode selection stage 118 may be configured to select a block partition based on the motion vector having the lowest updated cost score. Additionally, in some implementations, the mode selection stage 118 may be configured to encode the macroblock using a mode having the selected motion vector, reference index, and block partition. Example modes that may be selected may include direct temporal prediction, direct spatial prediction, bi-prediction, and skip modes.

It will be understood that the pipeline 100 may take any suitable form. For example, the pipeline may include additional stages, combine stages, re-order stages, and/or omit stages without departing the scope of the present disclosure.

As discussed above, a plurality of candidate predicted motion vectors may be selected to seed different motion searches, as an actual predicted motion vector may be unavailable due to hardware pipeline dependencies. In other words, rather than stalling the pipeline and reducing processing performance, the candidate predicted motion vectors may provide estimations to seed the motion searches, and later the search results may be corrected or re-scored when the actual predicted motion vector becomes available.

Figure 2:
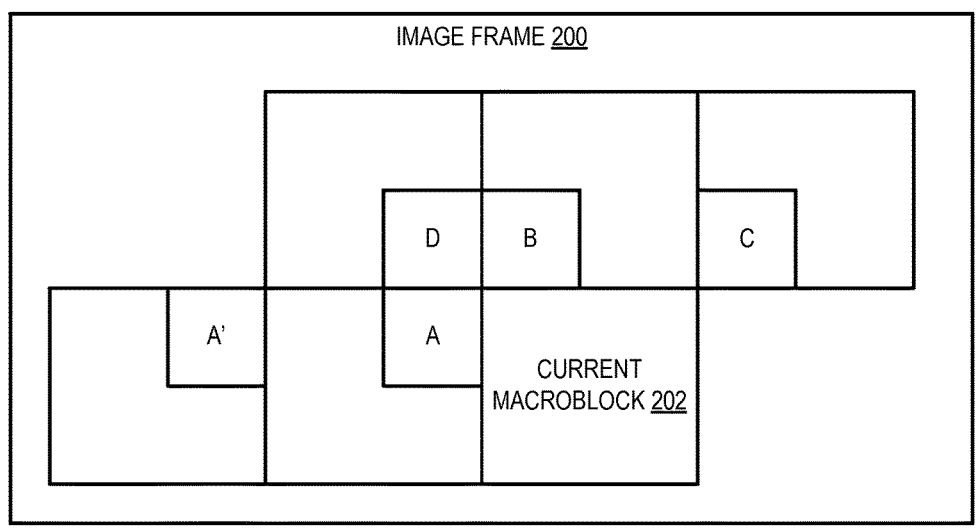
FIG. 2 shows an example image frame including a plurality of macroblocks.

FIG. 2 shows an example portion of an image frame 200 including a plurality of macroblocks from which candidate predicted motion vectors may be selected for use in motion searches. A current macroblock 202 may be in the process of being encoded in the processing pipeline. Macroblock A neighbors the current macroblock 202, and thus may be the macroblock ahead of the current macroblock in the processing pipeline. As such, contextual information including an actual predicted motion vector of macroblock A may be unavailable when encoding of the current macroblock 202 is initiated.

However, contextual information may be available from macroblocks A', C, B, and D when encoding of the current macroblock 202 is initiated, as those macroblocks may have already been encoded. Thus, in one example, the actual predicted motion vectors of these macroblocks may be selected as candidate predicted motion vectors to seed motion searches of the current macroblock 202. In another example, any suitable combination of actual predicted motion vectors selected from any number of surrounding macroblocks may be used as candidate predicted motion vectors. In another example, an actual predicted motion vector from a same macroblock as the current macroblock in a temporally different image frame may be selected as a candidate predicted motion vector. In another example, since neighboring macroblock A is not available, actual predicted motion vectors of next neighbor macroblock A' on temporally different image frames may be selected as candidate predicted motion vectors. If the current macroblock includes large objects in planar motion or represents a camera pan, then next neighbor macroblock A' may be a particularly good candidate to provide a candidate predicted motion vector.

In some approaches, a single actual predicted motion vector may be selected from macroblocks A'. B, C, or D to seed motion searches. In this case, searches may result in a local minima that may not produce accurate search results. By selecting a plurality of actual predicted motion vectors from a plurality of different macroblocks as candidate predicted motion vectors, the risk of selecting such a local minima may be reduced.

Figure 3:
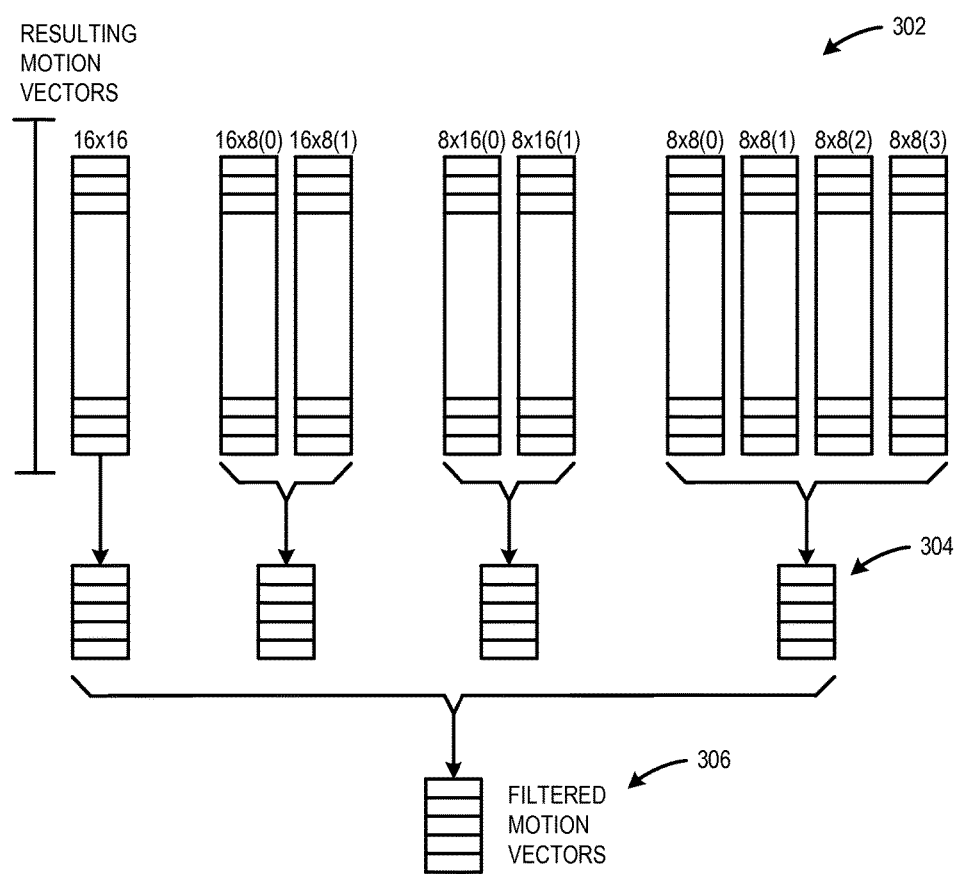
FIG. 3 shows an example process of filtering search results to select low cost filtered motion vectors for video encoding.

In some implementations, search results of motion searches may be filtered, and motion vectors having a lowest cost score may be kept and/or tracked for later re-scoring. In this way, data storage hardware resources may be reduced and processing performance may be increased in the hardware pipelined video encoder relative to an approach where motion vectors resulting from all motion searches are stored and tracked for downstream processing. FIG. 3 shows an example of filtering resulting motion vectors to select a subset of filtered motion vectors having lowest cost scores. A plurality of motion searches may be performed for each of the plurality of candidate predicted motion vectors to produce an initial set of resulting motion vectors 302. In the illustrated example, the initial set of resulting motion vectors 302 is represented as a table of nine columns. Each column refers to a different block partition type, and each column may include N resulting motion vectors based on searches using that block partition type. For example, N may be sixty four, one hundred twenty eight, two hundred fifty six, or another suitable number, wherein N may be selected based on the processing resources of the hardware video encoder, and/or any other suitable factor(s).

As part of the filter process, five resulting motion vectors having a lowest cost may be selected from each block partition column as secondary candidates 304. The secondary candidates 304 may be further filtered by cost to select the five motion vectors of the secondary candidates having the lowest cost score as filtered motion vectors 306. The filtered motion vectors 306 may be kept and re-scored when the actual predicted motion vector becomes available to provide an updated cost score for each filtered motion vector. In some implementations, the other resulting motion vectors may be discarded or no longer tracked.

It will be understood that the resulting motion vectors may be filtered to a set of any suitable number of filtered motion vectors without departing from the scope of the present disclosure. Moreover, the resulting motion vectors may be refined or filtered in any suitable manner to produce the set of filtered motion vectors.

In one example, for 16×16 macroblocks, motion estimation (ME) searches may include a plurality of smaller subblocks of a 16×16 macroblock. In such an implementation, a rate-distortion cost score may be determined for each of the subblocks. Further, when filtering in a given partition column 302 to create a smaller set of partitions 304, the various partitions may be combined differently based on the rate-distortion cost scores to create standardized partitions. When filtering the intermediate partitions/blocks 304 to determine the final set of partitions/blocks 306, a diverse set of partition types may be selected as filtered motion vectors such that each partition (mode) type may be represented in the set of filtered motion vectors. As such, a plurality of candidates may be used for a mode decision based on the rate-distortion criteria. In one example, the above described operations may be performed in a "logic cloud" (shown in FIG. 7).

Figure 4:
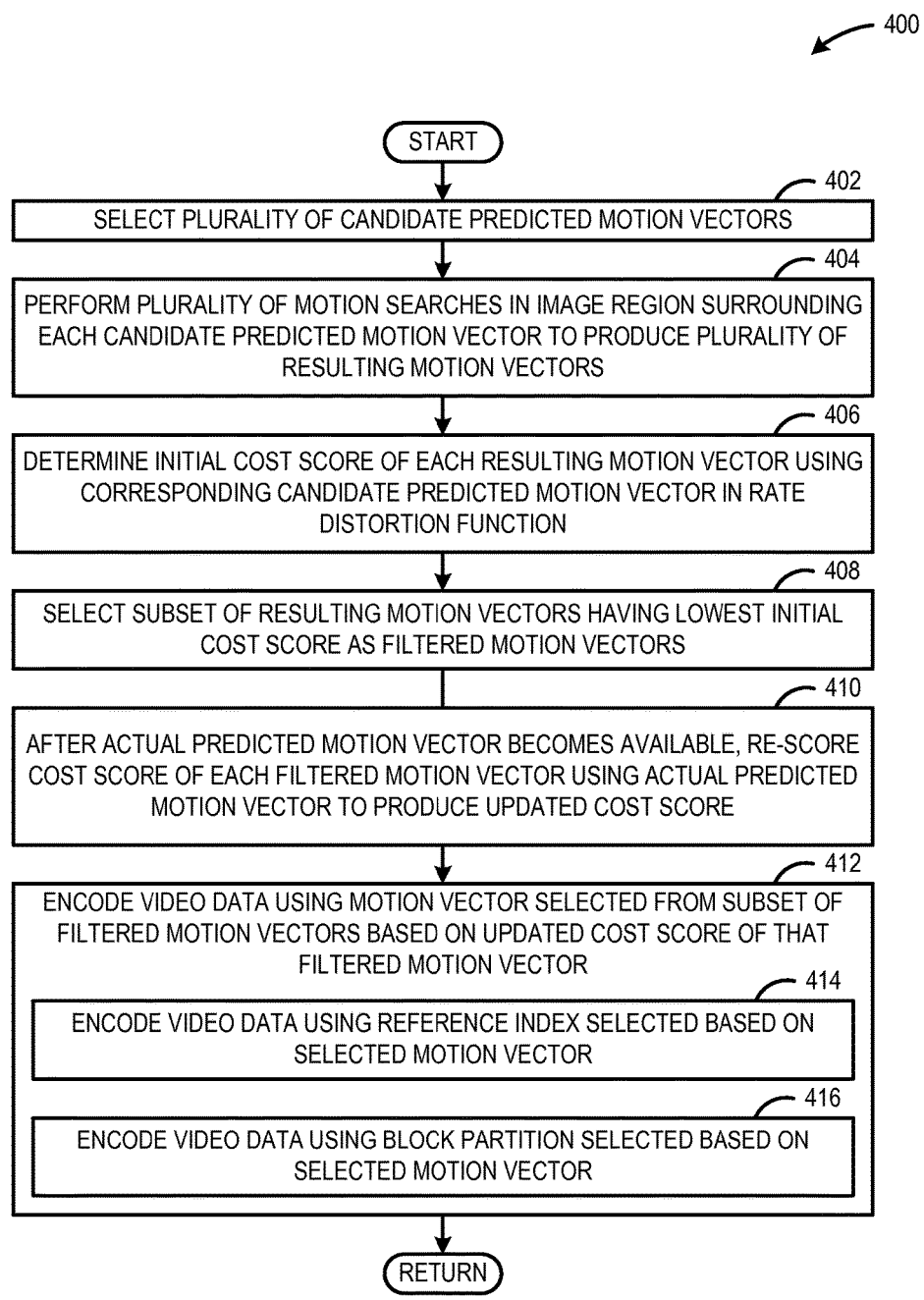
FIG. 4 shows a flow diagram depicting an example method for encoding video data using a hardware pipelined video encoder.

FIG. 4 shows a flow diagram depicting an example method 400 for encoding video data using a hardware pipelined video encoder. In one example, method 400 may be performed to encode a current macroblock of an image frame. It will be understood that method 400 may be performed on a computing device via execution of machine-readable instructions stored on the computing device.

At 402, method 400 includes selecting a plurality of candidate predicted motion vectors associated with the video data to be encoded (e.g., the current macroblock). As discussed above, the candidate predicted motion vectors may be selected, for example, from a neighboring macroblock of a same image frame, a same macroblock of a temporally different image frame, a neighboring macroblock of a temporally different image frame, a zero motion vector, and/or a predicted motion vector of another suitable macroblock, for example.

At 404, method 400 includes performing a plurality of motion searches in an image region surrounding each candidate predicted motion vector to produce a plurality of resulting motion vectors. Further, at 406, method 400 includes determining an initial cost score for each resulting motion vector using a corresponding candidate predicted motion vector in a rate-distortion function. At 408, method 400 includes selecting from the plurality of resulting motion vectors a subset of motion vectors having a lowest initial cost score as filtered motion vectors.

At 410, method 400 includes, after an actual predicted motion vector becomes available, re-scoring the initial cost score of each filtered motion vector in the subset using the actual predicted motion vector to produce an updated cost score. In one example, the actual predicted motion vector is a predicted motion vector from a neighboring macroblock that is ahead of the current macroblock in the processing pipeline.

At 412, method 400 includes encoding the video data using a motion vector selected from the subset of filtered motion vectors based on the updated cost score of that filtered motion vector. In one example, the video data may be encoded using the motion vector having the lowest updated cost score. In some implementations, at 414, method 400 includes encoding the video data using a reference index selected based on the filtered motion vector having the lowest updated cost score. In some implementations at 416, method 400 includes encoding the video data using a block partition selected based on the filtered motion vector having the lowest updated cost score.

By estimating a plurality of different candidate predicted motion vectors to seed the motion searches, motion searching may be performed without having to stall the pipeline to wait for the actual predicted motion vector to become available. Further, the search results may be re-scored when the actual predicted motion vector does become available. In this way, the motion vector having the lowest cost to encode the video data may be selected without reducing performance of the hardware pipeline to less than real-time performance.

Figure 5:
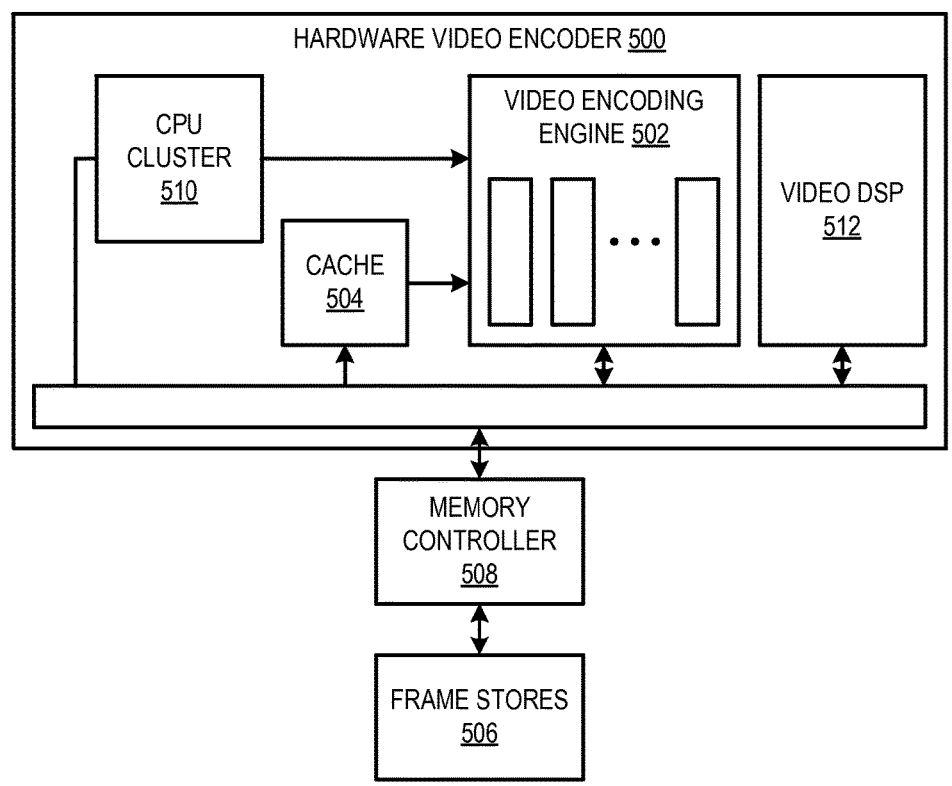
FIG. 5 shows an example hardware video encoder including a plurality of video encoding engines.

In some implementations, the above described method may be tied to a hardware video encoder. FIG. 5 shows an example hardware video encoder 500 that may be used to implement the method 400. The hardware video encoder 500 may include one or more pipelined video encoding engines 502 configured to perform motion estimation in which reference frames may be examined for similarities to input macroblocks. Further, the one or more video encoding engines 502 may be configured to perform motion compensation in which macroblocks may be predicted by block reconstruction from previously encoded image frames using motion vectors.

In one example, the one or more video encoding engines 502 may be programmed to perform motion estimation and/or motion compensation via instructions fetched from cache 504. Target frames and reference frames for motion estimation and motion compensation may be fetched from frame stores 506 by memory controller 508. A CPU cluster 510 may provide processing resources to the one or more video encoding engines 502 to perform video encoding in parallel. A video digital signal processor (DSP) 512 may be configured to perform transformation, scaling, quantization, and other operations between the original and the predicted macroblocks (e.g., the residual) as part of the encoding process.

It will be understood that the hardware video encoder 500 may be implemented in any suitable manner. For example, the hardware video encoder may be implemented as a stand-alone integrated circuit (IC). In another example, the hardware video encoder may be integrated in a system-on-chip (SOC).

Figure 6:
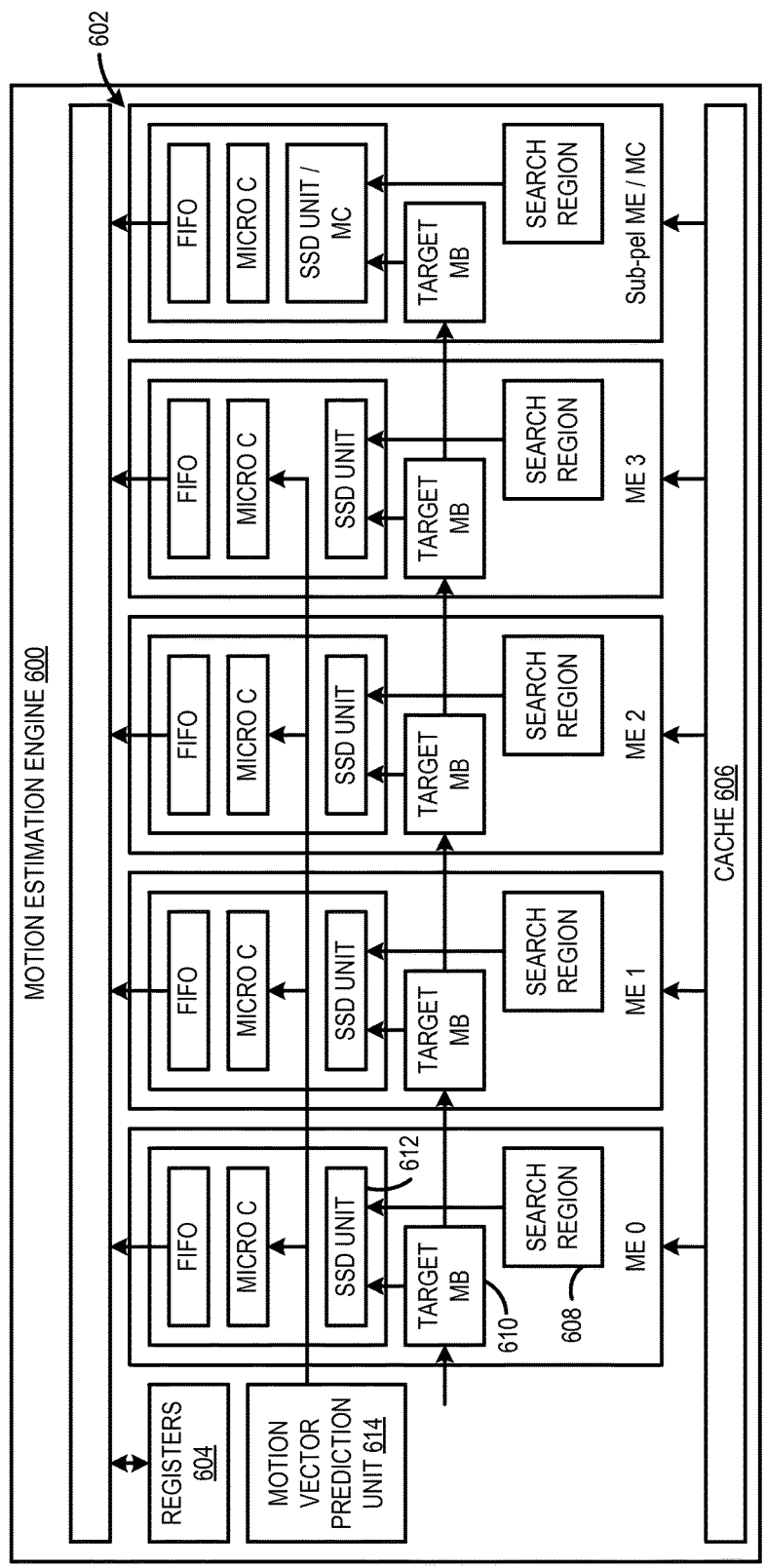
FIG. 6 shows an example video encoding engine including a plurality of motion search engines.

FIG. 6 shows an example video encoding engine 600. In one example, the video encoding engine 600 may be implemented in the hardware video encoder 500. The video encoding engine 600 may include a plurality of motion search engines 602. More particularly, the plurality of motion search engines 602 may include integer motion estimation engines (e.g., ME0-ME3) configured to perform motion estimation and a sub-pel motion estimation/motion compensation engine configured to sub-pixel motion estimation and/or perform motion compensation.

The video encoding engine 600 may be controlled through programming of a set of registers 604 and command instructions provided via a cache 606 to the plurality of motion search engines 602. In one example, address registers and control registers may be set to specify macroblocks in an image frame. For example, one or more of the registers may be loaded at the start of each new slice or frame.

Furthermore, the command instructions may enable/disable certain modes of operation of the different motion search engines. In one example, each integer motion estimation search engine may be configured to receive a candidate predicted motion vector and search a region surrounding that seed point in a specified reference using a specified search path. For example, each integer motion estimation engine may perform a motion search that includes comparing a search region 608 of a reference frame to a target macroblock 610 via a sum of squared difference (SSD) computation 612. In one example, the instructions may specify a separate SSD instruction, a filter instruction, or other atomic operations. For example, one command may be issued per prediction. Each search command may specify a given search pattern. Each command may produce zero or more new search results. For each macroblock, prior to the first command being issued for a given macroblock, a target macroblock may be loaded. The target macroblock may be loaded to all four integer motion estimation engines. Such a structure may reduce memory bandwidth and simplify a control scheme. After the motion searches have been performed, the motion vector prediction unit 614 may provide the actual predicted motion vector to the plurality of motion search engines and, the filtered motion vectors may be re-scored in the rate-distortion function using the actual predicted motion vector. In one example, the re-scoring operations may be performed by the CPU cluster 510 (shown in FIG. 5). Because the plurality of motion vectors and partition (mode) candidates are kept or tracked after the motion estimation searches are performed, refinement of these searches once the actual predicted motion vector is provided may be avoided. After the rescoring operation, the lowest cost mode for encoding the macroblock may be selected.

Figure 7:
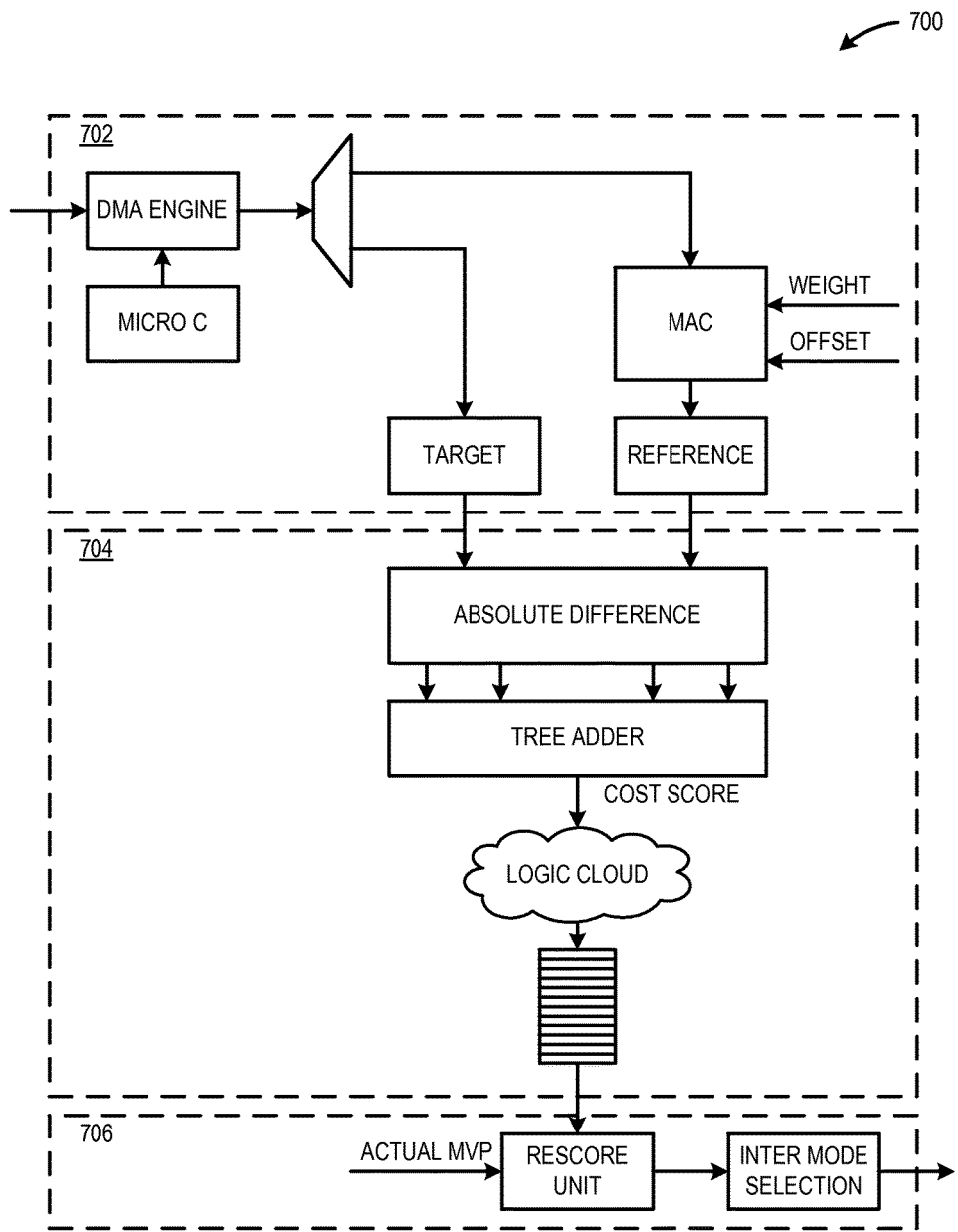
FIG. 7 shows an example motion search engine.

FIG. 7 shows an example motion search engine 700. In one example, the motion search engine 700 may be implemented in the video encoding engine 600. The motion search engine 700 may include a loading stage 702, a searching stage 704, and a sorting stage 706. In the loading stage 702, a target macroblock and a reference frame may be loaded into the processing pipeline by setting the registers and receiving search instructions.

Once the search instructions are received and the search engine is configured for the motion search, the motion search may be performed by the searching stage 704. In one example, during each cycle of a motion search, a single motion-vector may be performed (although it may be pipelined over a number of physical cycles) to produce a SAD computation with respect to the target and the macroblock. This operation may be performed in a single cycle throughput. Then, over a number of cycles, the tree adder may perform distortion measures of the rate-distortion function for the given macroblock. In one example, for each macroblock, either nine or forty-one results may be produced depending on whether a sub-partition mode is enabled as part of the search command. These forty-one distortion values feed into the logic cloud where comparison operations may be performed to select the filtered motion vectors having the lowest initial cost scores. The output of each search may include the rate, distortion, and motion information of each resulting motion vector.

Once the motion searches are performed and the resulting motion vectors are refined, re-scoring using the actual predicted motion vector and encoding mode selection may be performed by the sorting stage 706. In one example, an encoding mode may be selected using a single reference frame and a partition size greater than 8×8 for the rate-distortion function.

Figure 8:
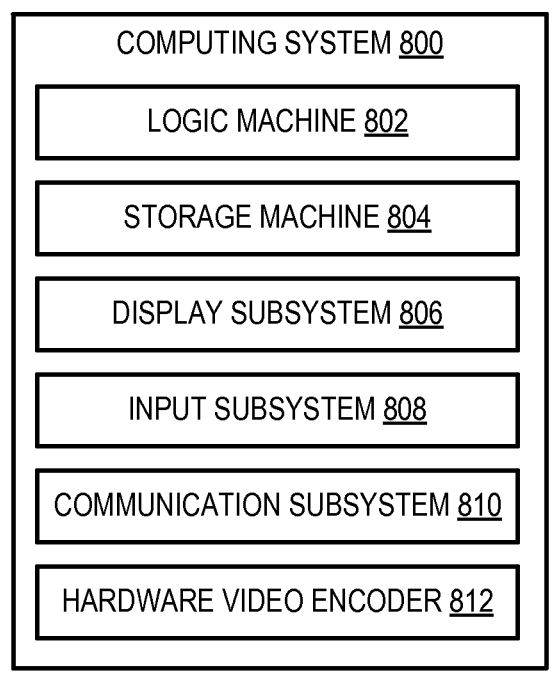
FIG. 8 shows an example computing system.

In some embodiments, the methods and processes described herein may be tied to a computing system of one or more computing devices. FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, hardware video encoder 812 and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.), as opposed to being stored in a storage device comprising a storage medium.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Hardware video encoder 812 may be configured to select a plurality of candidate predicted motion vectors associated with video data to be encoded, perform a plurality of motion searches in an image region surrounding each candidate predicted motion vector to produce a plurality of resulting motion vectors, each resulting motion vector having an initial cost score determined using a corresponding candidate predicted motion vector, after an actual predicted motion vector becomes available, re-score the initial cost score of each resulting motion vector using the actual predicted motion vector to produce an updated cost score, and encode the video data using a motion vector selected from the plurality of resulting motion vectors based on the updated cost score of that motion vector. In one example, hardware video encoder may be implemented as hardware video encoder 500 shown in FIG. 5. Although it will be understood that other variation may be contemplated without departing from the scope of the present disclosure.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising:
    a hardware pipelined video encoder configured to:
        select a plurality of candidate predicted motion vectors associated with video data to be encoded,
        perform a plurality of motion searches in an image region surrounding each candidate predicted motion vector to produce a plurality of resulting motion vectors, each resulting motion vector having an initial cost score determined using a corresponding candidate predicted motion vector,
        after an actual predicted motion vector, which was previously unavailable when the plurality of candidate predicted motion vectors were selected for the plurality of motion searches, becomes available due to completion of encoding of a block that includes the actual predicted motion vector, re-scoring the cost score of each resulting motion vector of the plurality of resulting motion vectors to determine an updated cost score for each resulting motion vector by using the actual predicted motion vector, and
        encode the video data using a motion vector selected from the plurality of resulting motion vectors based on the updated cost score.

2. The computing device of claim 1, wherein the initial cost score of a resulting motion vector is determined by using the corresponding candidate predicted motion vector in a rate-distortion function.

3. The computing device of claim 1, wherein the updated cost score of a resulting motion vector is determined by using the actual candidate predicted motion vector in the rate-distortion function.

4. The computing device of claim 1 wherein the hardware pipelined video encoder is further configured to
    select from the plurality of resulting motion vectors a subset of motion vectors having a lowest initial cost score as filtered motion vectors;
    after the actual predicted motion vector becomes available, re-score the initial cost score of each filtered motion vector in the subset using the actual predicted motion vector to produce the updated cost score; and
    encode the video data using a motion vector selected from the subset of filtered motion vectors based on the updated cost score of that filtered motion vector.

5. The computing device of claim 1, wherein two or more of the plurality of motion searches includes different search patterns.

6. The computing device of claim 1, wherein two or more of the plurality of motion searches includes different search regions.

7. The computing device of claim 1, wherein the plurality of candidate predicted motion vectors include one or more of a neighboring block of a same image frame, a same block of a temporally different image frame, a neighboring block of a temporally different image frame, and a zero motion vector.

8. The computing device of claim 1, wherein the hardware pipelined video encoder is further configured to:
    encode the video data using a reference index selected based on the motion vector having the lowest updated cost score.

9. The computing device of claim 1, further comprising:
    encode the video data using a block partition selected based on the motion vector having the lowest updated cost score.

10. A storage machine holding instructions executable by a logic machine to:
    select a plurality of candidate predicted motion vectors associated with video data to be encoded;
    perform a plurality of motion searches in an image region surrounding each candidate predicted motion vector to produce a plurality of resulting motion vectors, each resulting motion vector having an initial cost score determined using a corresponding candidate predicted motion vector in a rate-distortion function;
    after an actual predicted motion vector, which was previously unavailable when the plurality of candidate predicted motion vectors were selected for the plurality of motion searches, becomes available due to completion of encoding of a block that includes the actual predicted motion vector, re-score the cost score of each resulting motion vector of the plurality of resulting motion vectors to determine an updated cost score for each resulting motion vector by using the actual predicted motion vector in the rate-distortion function calculation; and
    encode the video data using a motion vector selected from the plurality of resulting motion vectors based on the updated cost score.

11. The storage machine of claim 10, further holding instructions executable by the logic machine to:
    select from the plurality of resulting motion vectors a subset of motion vectors having a lowest initial cost score as filtered motion vectors;
    after the actual predicted motion vector becomes available, re-score the initial cost score of each filtered motion vector in the subset using the actual predicted motion vector to produce the updated cost score; and
    encode the video data using a motion vector selected from the subset of filtered motion vectors based on the updated cost score of that filtered motion vector.

12. The storage machine of claim 10, wherein two or more of the plurality of motion searches includes different search patterns, and wherein two or more of the plurality of motion search includes different search regions.

13. The storage machine of claim 10, wherein the plurality of candidate predicted motion vectors include one or more of a neighboring block of a same image frame, a same block of a temporally different image frame, a neighboring block of a temporally different image frame, and a zero motion vector.

14. The storage machine of claim 10, further holding instructions executable by the logic machine to:
- encode the video data using a reference index selected based on the motion vector having the lowest updated cost score; and
- encode the video data using a block partition selected based on the motion vector having the lowest updated cost score.

15. On a computing device, a method for encoding a block of an image frame using a hardware pipelined video encoder, the method comprising:
- selecting a plurality of candidate predicted motion vectors;
- performing a plurality of motion searches in an image region surrounding each candidate predicted motion vector to produce a plurality of resulting motion vectors, each resulting motion vector having an initial cost score determined using a corresponding candidate predicted motion vector;
- selecting from the plurality of resulting motion vectors a subset of motion vectors having a lowest initial cost score as filtered motion vectors;
- after the actual predicted motion vector, which was previously unavailable when the plurality of candidate predicted motion vectors were selected for the plurality of motion searches, becomes available due to completion of encoding of a block that includes the actual predicted motion vector, re-scoring the cost score of each filtered motion vector to determine an updated cost score for each filtered motion vector in the subset by using the actual predicted motion vector; and
- encoding the block using a filtered motion vector selected from the filtered motion vectors of the subset based on the updated cost score.

16. The method of claim 15, wherein the plurality of candidate predicted motion vectors include one or more of a neighboring block of a same image frame, a same block of a temporally different image frame, a neighboring block of a temporally different image frame, and a zero motion vector.

17. The computing device of claim 1, wherein the plurality of candidate predicted motion vectors are selected from different, previously encoded blocks.

18. The computing device of claim 1, wherein each resulting motion vector has an initial cost score determined using a different candidate predicted motion vector in a cost score calculation, and wherein the updated cost score is determined for each resulting motion vector by using the actual predicted motion vector in place of the corresponding candidate predicted motion vector in the cost score calculation.

19. The storage machine of claim 10, wherein each resulting motion vector has an initial cost score determined using a different candidate predicted motion vector in the rate-distortion function, and wherein the updated cost score is determined for each resulting motion vector by using the actual predicted motion vector in place of the corresponding candidate predicted motion vector in the rate-distortion function.

20. The method of claim 15, wherein each resulting motion vector has an initial cost score determined using a different candidate predicted motion vector in a cost score calculation, and wherein the updated cost score is determined for each filtered motion vector by using the actual predicted motion vector in place of the corresponding candidate predicted motion vector in the cost score calculation.

* * * * *